Sept. 3, 1963
C. E. ROBERTS
3,102,607
CARRIER SYSTEM FOR TRANSPORT AND DELIVERY ALONG A TRACKWAY
Filed Dec. 19, 1960
3 Sheets-Sheet 1
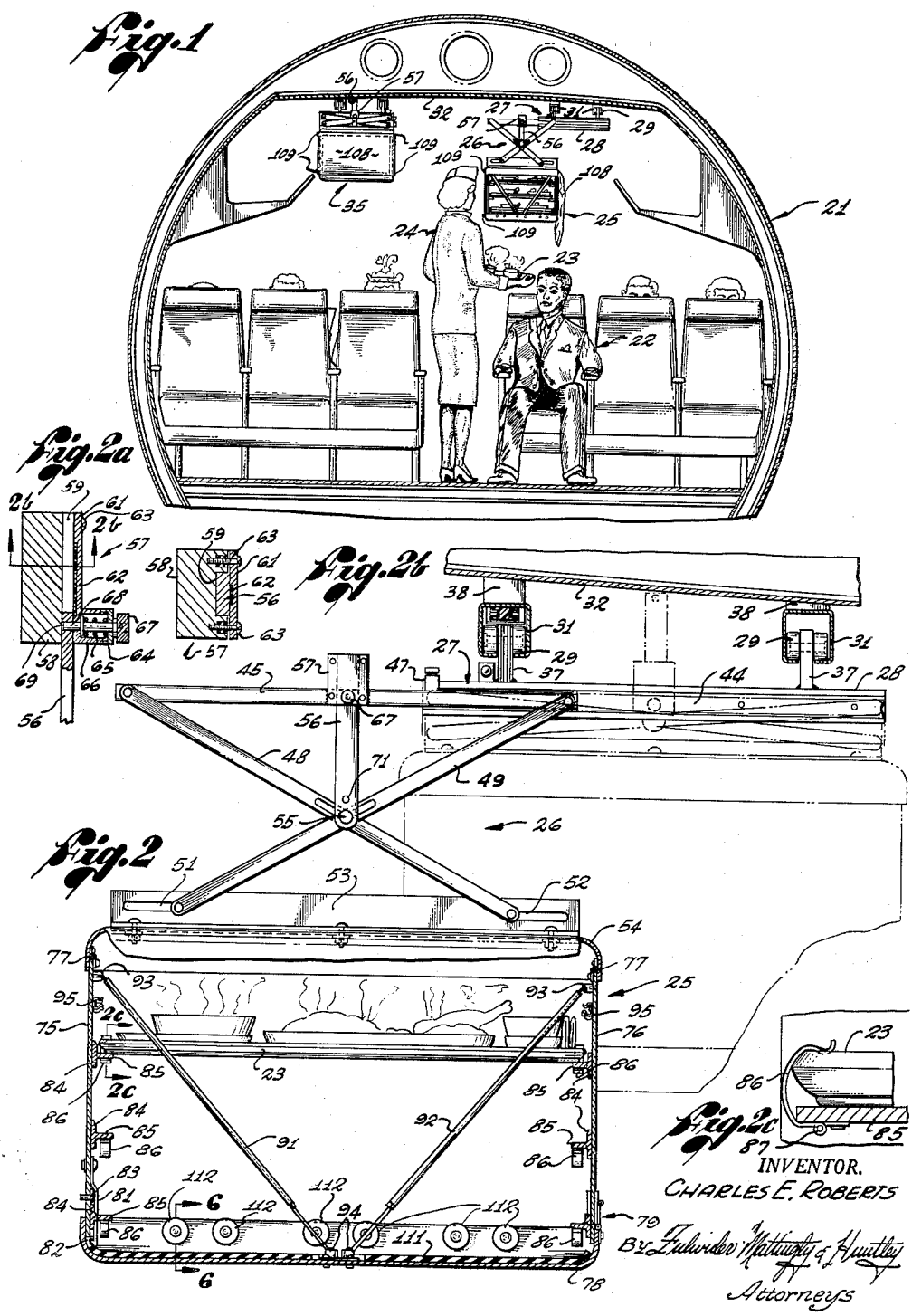
INVENTOR.
CHARLES E. ROBERTS
BY Fulwider Mattingly & Huntley
Attorneys Sept. 3, 1963                C. E. ROBERTS                3,102,607
CARRIER SYSTEM FOR TRANSPORT AND DELIVERY ALONG A TRACKWAY
Filed Dec. 19, 1960                              3 Sheets-Sheet 2
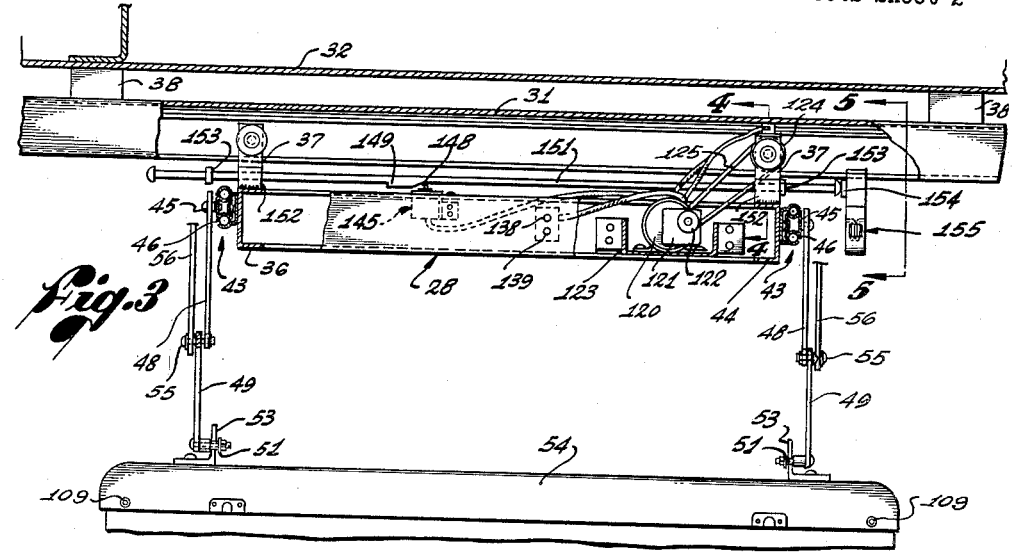
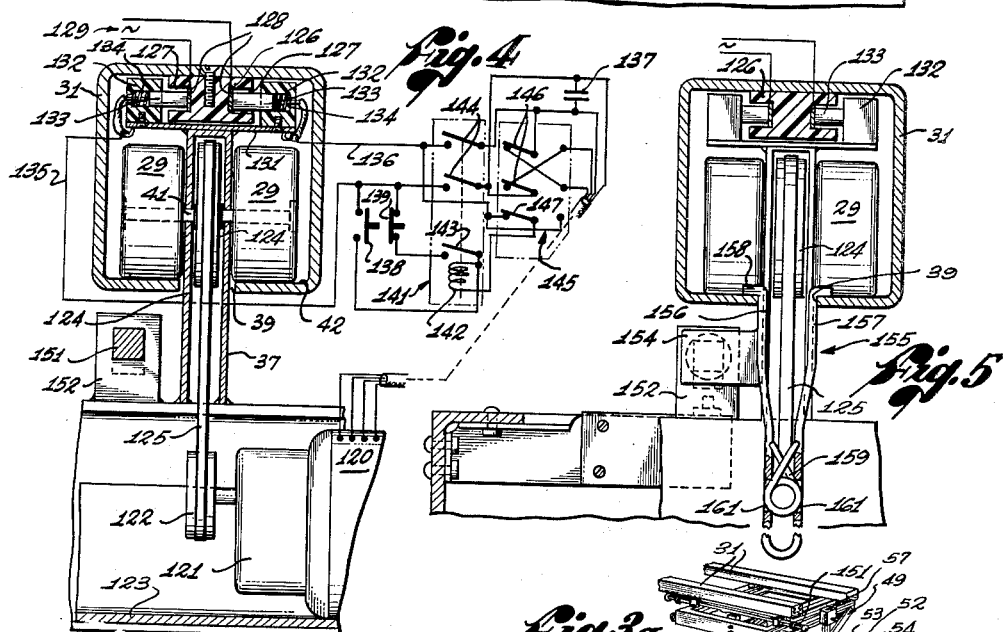
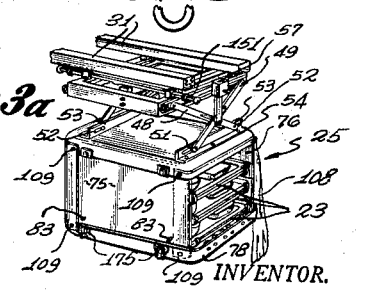
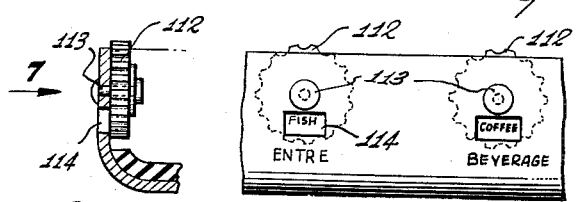
INVENTOR.
CHARLES E. ROBERTS
BY
Attorneys Sept. 3, 1963 C. E. ROBERTS 3,102,607
CARRIER SYSTEM FOR TRANSPORT AND DELIVERY ALONG A TRACKWAY
Filed Dec. 19, 1960 3 Sheets-Sheet 3
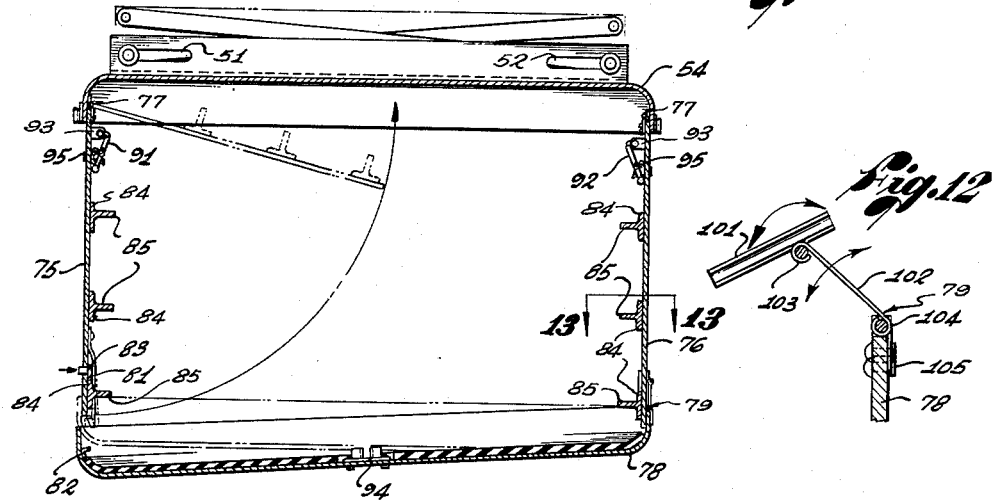
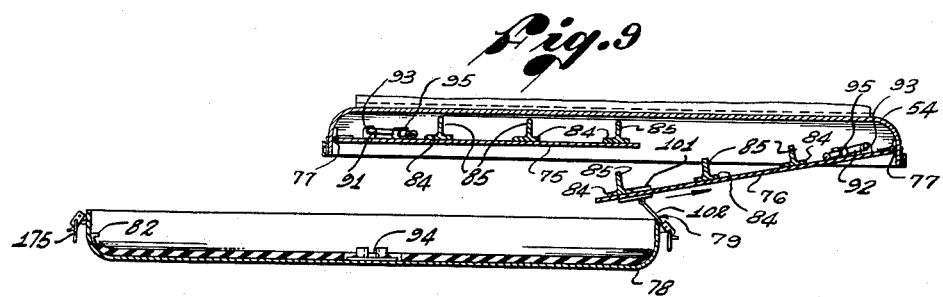
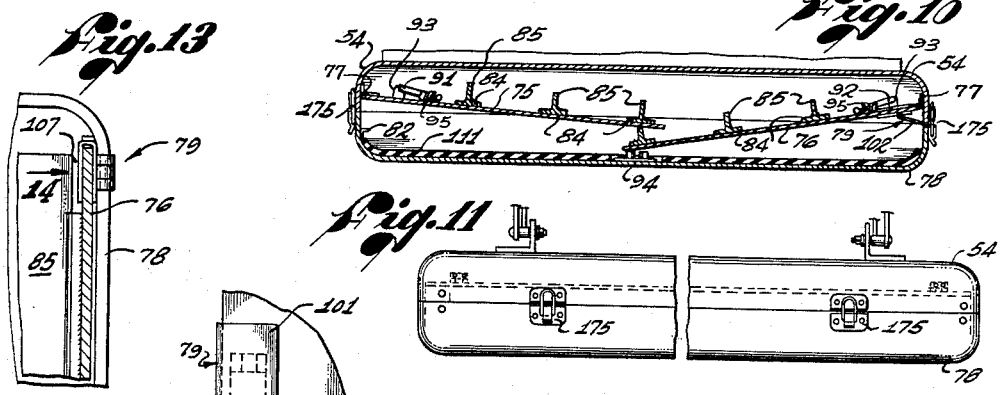
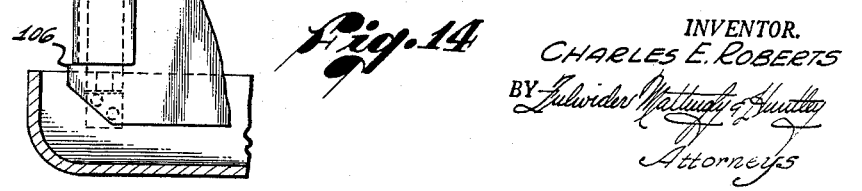
INVENTOR.
CHARLES E. ROBERTS

United States Patent Office 3,102,607
Patented Sept. 3, 1963

3,102,607
CARRIER SYSTEM FOR TRANSPORT AND
DELIVERY ALONG A TRACKWAY
Charles E. Roberts, 3756 May St., Los Angeles 66, Calif.
Filed Dec. 19, 1960, Ser. No. 76,773
3 Claims. (Cl. 186—1)

The present invention relates generally to carrier systems for the transport and delivery of articles or material along a trackway.

In the transport and delivery of various articles and material from loading to delivery stations, many arrangements, both manually and automatically controlled, have been suggested. These have ranged from manual lifting and carrying, to complicated electrical, mechanical and pneumatic systems for automatically delivering articles and material to designated stations in accordance with an initial programming. The carrier system according to the present invention incorporates both manual and automatic control in a simple but effective arrangement which relieves the operator of various manual manipulations including the transport of the material. The system has desirable features of automatic control of the running and stopping of the carrier, and also has access features by which the carrier may be moved relative to its traveling carriage, while supported thereon, to facilitate loading and unloading of the carrier.

One of the many applications for the system of this invention, and which has been selected for illustration and description herein as one presently preferred embodiment, is in the transport of food and beverages from storage and/or preparation areas on aircraft to the individual passenger's seats. With present day jet aircraft, the speed of flight and large passenger capacity of the planes place heavy burdens on the stewardesses in supplying the passengers. The relatively long cabins and large number of passengers require considerable labor on the part of the stewardesses in carrying the trays and walking to and from the galley or storage and preparation area. Also, a relatively long time is required in completing a serving, so much so that the last passengers to be served must often hurry their consumption in order to complete a meal prior to landing. Even in long flights it is undesirable from the passengers' standpoint to have such a long period of time elapse between the serving of the first and last passengers since the latter naturally become impatient.

According to the present invention, a system of power operated carriers is provided in an aircraft, in which trays of food, beverages, etc. are loaded at the galley or storage area, and which move along the cabin of the aircraft on rails or other supports mounted on the cabin structure. These carriers preferably stop automatically at stations whose locations are controlled by the stewardess, and may then be moved laterally of their carriages toward the aisle of the aircraft and lowered for easy access to facilitate the removal of the individual servings therefrom. Preferably, a pair of carriers are provided, one at each side of the cabin, so that one may be loaded while the other one is being emptied. The carriers moved independently along the cabin in opposite directions, with each empty carrier being returned to the galley for loading and each full carrier being forwarded to the passenger area where it is automatically stopped at a dispensing position selected by the stewardess. While specifically illustrated and described in connection with service on aircraft, it will be understood that the invention is not limited thereto as many other applications will be apparent in which the carrier system may be utilized for the transport and delivery of articles and material generally.

It is therefore an object of this invention to provide an improved carrier system for the transport and delivery of articles and material along a trackway.

Another object of this invention is the provision of a transport and delivery system having improved manual and automatic control characteristics and constructional features facilitating loading of and delivery from the carrier.

Another object of this invention is the provision of an improved transport and delivery system having a carriage movable along a trackway, in which a carrier is suspended from the carriage so as to be movable relative thereto into a readily accessible position while still supported upon the carriage.

A further object of this invention is the provision of an improved carrier system for transport and delivery along a trackway in which the carrier may be automatically stopped at any desired dispensing position by means universally positionable at any point along the trackway selected by an operator.

A still further object of this invention is the provision of an improved transport and delivery system having automatic means for stopping a carrier at selected stations along a trackway, in which the stop means automatically conditions the carrier for movement in the return direction subject to initiation by the operator.

Yet another object of the invention is the provision of an improved carrier system for the transport and delivery of articles along a trackway which has information means which may be set at a delivery station to provide loading information at a loading station.

A more specific object of this invention is the provision of an improved carrier system for use in aircraft to transport food and beverages from a galley or storage area to the passenger locations.

These and other objects and features of the invention will be readily apparent to those skilled in the art from the following description of one presently preferred embodiment of the invention and the appended drawings thereof in which:

FIGURE 1 is a transverse vertical sectional view through a cabin of an aircraft showing a transport and delivery system according to the present invention mounted therein.

FIGURE 2 is a view partly in section and partly in elevation showing a carrier and its supporting carriage according to the present invention, with the carrier in its delivery or loading position.

FIGURE 2a is a detailed sectional view of the vertical guiding and holding means for the carrier mounting.

FIGURE 2b is a horizontal sectional view on the line 2b—2b of FIGURE 2a.

FIGURE 2c is a detailed sectional view on the line 2c—2c of FIGURE 2, showing a tray latch.

FIGURE 3 is a view partly in side elevation and partly in longitudinal section, showing details of the trackway, the carriage and the carrier mounting.

FIGURE 3a is a perspective view of the carrier and its mounting carriage with the carrier in a non-extended but lowered position.

FIGURE 4 is a fragmentary vertical sectional view through one of the trackways and a portion of the carriage along the line 4—4 of FIGURE 3, and showing a schematic wiring diagram for the electric motor control circuit.

FIGURE 5 is a partial vertical sectional view along the line 5—5 of FIGURE 3, and showing the position selecting, stopping element for the system.

FIGURE 6 is a detailed sectional view, on the line 6—6 of FIGURE 2, of the intelligence providing means.

FIGURE 7 is an end elevational view of the intelligence means taken in the direction of the arrow 7 in FIGURE 6.

FIGURE 8 is a transverse vertical sectional view through the carrier with the bottom pan open.

FIGURE 9 is a transverse vertical sectional view through the carrier showing the side panels swung inwardly and upwardly.

FIGURE 10 is a transverse vertical sectional view showing the fully collapsed position of the carrier with the top and bottom pans latched together and with the side panels disposed therebetween.

FIGURE 11 is a side elevational view showing the collapsed position of the carrier.

FIGURE 12 is a detailed view of the hinge mounting the bottom pan of the carrier to the side panel.

FIGURE 13 is a detailed sectional view of a corner of the carrier taken on the line 13—13 of FIGURE 8.

FIGURE 14 is a partial elevational view taken in the direction of the arrow 14 of FIGURE 13.

The adaptation of the carrier system of the present invention to service on aircraft is shown in the transverse vertical sectional view of FIGURE 1 taken through the fuselage 21 and showing a passager 22 seated in the foreground and being served a food tray 23 by a stewardess 24. Delivery or service is being made from a carrier 25 shown in laterally extended and lowered position while mounted by a linkage mechanism 26 from a slide 27 supported on a carriage 28. The carriage 28 is dependingly supported by rollers 29 riding in trackways 31 supported adjacent to the ceiling panel 32 of the aircraft cabin. A second carrier 35 identical with the carrier 25 is shown in its upward, traveling position at the left hand upper portion of FIGURE 1. The construction and mounting for the carrier 35 is identical with that for the carrier 25, so only the latter will be specifically described herein. The carrier 35 may represent a newly filled one which has just been received at a dispensing location selected by the stewardess as hereinafter explained, and now ready to be moved laterally toward the aisle and lowered into dispensing position. When the carrier 25 has been emptied it will be raised and slid under the carriage 28 in a position corresponding to that in which the carrier 35 is shown and thereafter the empty carrier will be dispatched back to the galley or storage area for refilling and return to another selected dispensing location. After returning the carrier 25 the stewardess will turn to the carrier 35 and serve therefrom, thus alternating the carriers in use, so that one may be in process of being filled at the galley while the other is being emptied at a passager location.

Referring more particularly to FIGURES 2 and 3, the carriage 28 is in the form of an open rectangle formed from a C-shaped channel 36. To the upper surfaces of the opposite ends of the carriage 28 are secured four supports 37, such as by brazing or welding. The trackways 31 are in the form of rectangular channels mounted adjacent to the ceiling panels 32 of the aircraft cabin by suitable supports 38, so that the trackways are in substantially horizontally spaced relation. The channels 31 are provided with longitudinal slots 39 in their bottom walls through which the supports 37 extend. Axles 41 extend through the supports 37 interiorly of the trackways 31 and upon the axles are mounted the supporting rollers 29 which ride on the upper surfaces 42 of the bottom walls of the trackways 31 on opposite sides of the slots 39.

At opposite ends of the carriage 28 are mounted the slide supports 27, each including a stationary channel or bracket member 44 rigidly mounted on the end face of the carriage 28 and a movable slide member 45 supported in the channel 44 through the medium of bearing balls 46. To lock the slide 45 in its retracted and extended positions, the stationary channel 44 is provided with detent means 47 biased to engage in suitable openings in the upper surface of the slide 45, in locking relation.

Adjacent the opposite ends of the slide 45 are pivoted supporting links 48 and 49, duplicated at the opposite ends of the carriage 28. The lower ends of the links 48 and 49 have pin and slot connections at 51 and 52, respectively, with the vertical legs of L-shaped brackets 53 whose horizontal legs are secured to the top surface of an upper pan-shaped member 54 of the carriers 25—35. Intermediate their ends the links 48 and 49 are interconnected by a pin 55 which rides in a pair of slots in the links, as shown more particularly in FIGURE 2. A vertical guide member 56 is secured to the pin 55 and is slidable within a vertical guide 57 shown in detail in FIGURES 2a and 2b. The guide 57 includes a main body portion 58 having a vertical slot 59 therein within which the member 56 is slidably guided. The main body portion 58 is secured to the slide 45 and is provided with an adjustable front plate 61 having a lining material 62 engaging the face of the member 56 to snub its downward movement relative to the guide. This frictional resistance may be adjusted by the screws 63 which secure the front plate 61 on the body portion 58. Upon the front plate 61 is mounted a detent 64 surrounded by a biasing spring 65 within a cup member 66 and having a manual knob 67 at its exterior end. The interior end 68 of the detent 64 is received within openings 69 and 71 in the member 56 to lock the carrier in the its lowered and upper positions, respectively.

To the opposite sides of the upper pan-shaped member 54 are pivotally mounted side panels 75 and 76 as by conventional hinges 77. A lower pan-shaped member 78, forming the bottom for the carrier 25, is hingedly mounted to the side panel 76 by a slidable and expandable hinge 79, shown in detail in FIGURE 12 and explained more fully hereinafter in connection with the folding of the carrier into its collapsed position. The side panel 75 is provided with a pair of spring latches 81 which engage with flanges 82 on the inside of the bottom pan 78 to hold it in assembled position. Plungers 83 are provided for disengaging the latches 81, as shown more particularly in FIGURE 8.

Upon the inner surfaces of the side panels 75 and 76 are mounted T-shaped brackets 84 which provide horizontally extending rails or shelves 85 on which the service trays are mounted, as shown more particularly in FIGURE 2. At the ends of the rails 85 are mounted spring clips 86 hinged at 87 so that they may be snapped over the edges of the trays 23 to retain them in place within the carrier, as shown more particularly in FIGURE 2c. As specifically illustrated in the drawing, three pairs of rails 85 are shown spaced vertically to support three of the trays 23 at each end of the carrier. Centrally of the carrier 25 are mounted a pair of rigidifying rods 91 and 92, which also serve to separate trays at the opposite ends of the carrier. The rods 91 and 92 are mounted on the side panels 75 and 76, respectively, by means of ball sockets 93 providing for universal swinging movement of the arms and in assembled position are received within spring sockets 94 mounted on the bottom pan 78 of the carrier. The side panels 75 and 76 are also provided with clips 95 which receive the rods 91 and 92 in the collapsed positions of the carrier parts, as shown in FIGURES 8 through 10.

A hinge 79 is disposed at each end of the side panel 76. These hinges include a sliding clip 101 which is U-shaped in cross section to embrace the opposite faces of the panel. A hinged link 102 is pivotally mounted to the clip 101 at 103 and has its opposite end pivoted at 104 to a stationary hinge part 105 rigidly secured to the pan 78. The clip 101 is limited in its downward position by a nose 106 at the bottom of the side panel 76 and may be slid along the end edge of the side panel toward the upper edge thereof into the position of FIGURE 10, passing through clearance slots 107 provided in the opposite ends of the rails 85.

A curtain 108 is provided to close each end of the carriers, being removably attached to the upper and lower pans 54 and 78 by means of cooperating snaps 109. The bottoms of the curtains 108 are disposed within the upstanding ends of the pan 78 so that any material which might be thrown against the curtains will pass downwardly on the inward surface thereof into the pan. To absorb any such material in liquid form the bottom of the pan 78 is provided with a lining of removable absorbent material 111.

The carrier is preferably provided with intelligence devices for indicating the passengers' selections, these being exemplified at the opposite ends of the pan 78 by discs 112 pivotally mounted by rivets 113 to the end walls of the pan and having portions thereof visible through opening 114 through the pan walls. A pair of these discs is preferably provided for each tray position, with one disc of each pair indicating the entree and the other the beverage desired by a passenger to be served with the tray with which the pair is associated. This arrangement may be seen more particularly in FIGURES 3a, 6 and 7.

The power operating means for the carrier will now be described with particular reference to FIGURES 3, 4 and 5. An electric drive motor indicated at 120 drives a suitable gear reduction box 121 whose output rotates a pulley 122. The motor 120 is mounted in a channel 123 which extends across the carriage 28 and is secured to the opposite side walls thereof. Referring now to FIGURE 4, at least one of the wheels 29 is rigidly secured to the shaft 41 as is also secured a drive pulley 124 connected to the motor driven pulley 122 by a belt 125. The support 37 is generally U-shaped in cross section and the pulley 124 and drive belt 125 are disposed between the legs thereof.

Against the under surface of the top wall of the rectangular trackway 31 is mounted an insulating strip 126, substantially I-shaped in cross section as viewed in FIGURES 4 and 5. Recesses or channels 127 are provided in the opposite sides of the insulating strip 126 and against the back walls of these recesses are disposed elongated conducting strips 128 connected to an external source of electrical power 129. Upon the bight of the U-shaped support 37 is mounted a supporting plate 131 carrying a pair of insulating blocks 132 in which are mounted carbon brushes 133 biased by springs 134 into engagement with the conducting strips 128 to take power therefrom to the conductors 135 and 136.

A schematic wiring diagram for control of the motor 120 is shown in FIGURE 4. The motor 120 is preferably a four wire, capacitor type motor employing the usual capacitor 137 across one winding thereof to secure a phase shift. The components of this circuit include a normally open push button start switch 138 and a normally closed push button stop switch 139. An electromagnetic relay 141 has an operating coil 142, a holding contact 143 and motor energizing contacts 144. A relay drop out and motor reversing switch is indicated generally at 145 and is of the three pole, double throw construction having a pair of contacts 146 controlling the direction of rotation of the motor 120 and a relay drop out contact 147 in the circuit of the relay operating coil 142. The switch 145 has a plunger actuator 148 (FIGURE 3) shown in its projected position with the contacts 146 and 147 closed to the left, as viewed in FIGURE 4. The plunger 148 is depressed by a cam 149 on the underface of an elongated rod 151 mounted above the carriage 28 for reciprocating movement relative thereto within a pair of supports 152. Stops 153 on the rod 151 limit its movement in opposite direction relative to the carriage. As shown in FIGURES 3 and 5, the end of the rod 151 has engaged an arm 154 extending laterally from a U-shaped member 155 whose opposite legs 156 and 157 are clamped against the opposite edges of the slot 39 in the trackway 31. The legs 156 and 157 are provided with end flanges at 158 which extend over the edges of the slot 39 when the member 155 is expanded. A spring 159 has a spiral portion received within openings 161 through the legs 156 and 157, and has its ends engaging the opposed faces of the legs to bias them toward separated position. It is thus seen that by pressing the legs 156 and 157 together the member 155 may be removed from the trackway 31 and is reassembled therewith at any point along the trackway at which it is desired to stop the carrier to establish a serving position.

In describing the operation of the carrier system of the present invention it will be assumed that the carrier 25 has been emptied and it is now desired to return it to the galley or storage area for refilling.

Before sending the carrier 25 back to the galley for refilling, the stewardess will determine the food and beverage selections of the next group of passengers to be served and will place this intelligence on the discs 112 for the information of the stewardess loading at the galley.

The curtains 108 may be snapped back in place or folded into the carrier as desired. The detent 64 is released and the carrier raised with the member 56 sliding upwardly through the guide 57 and the links 48 and 49 assuming a near horizontal position, at which time the detents 64 will engage in the hole 71 to hold the carrier in its elevated position. Thereupon the detent 47 is released and the carrier pushed laterally toward the carriage 28 into a position corresponding to that of the carrier 35, the detent 47 engaging in its appropriate hole at this point to lock the carrier in position ready for travel. The reversing switch 145 will have operated to condition the motor 120 for energization to reverse its rotation and this occurs when the stewardess depresses the starting button 138 to energize the coil 142 and close contacts 143 and 144. Contact 143 forms a holding circuit around the push button 138 and the contacts 144 energize the motor 120 through the contacts 146. The motor 120 now rotates the pulley 122 which, through the belt 125, rotates pulley 124 and the associated wheel 29 on the axle 41 to drive the carriage and carrier along the trackways 31 back to the galley or food storage position. When the carrier reaches this position the rod 151 will engage a stop and will be moved backward relative to the carriage so its cam 149 will depress the plunger 148 on the switch 145. As the end of the plunger 148 rides down the inclined surface of the cam 49 the contacts 146 and 147 are first opened to de-energize both the motor 120 and the operating coil 142 of the relay 141 which now drops out. Continued movement of the rod 151 further depresses the plunger 148 to engage the contacts 146 and 147 with the stationary contacts at the right in FIGURE 4, but this does not re-energize the motor since contacts 144 opened when the relay 141 dropped out. This operation of the switch 145 has reversed two of the leads to the motor and accordingly has conditioned it for rotation in the opposite direction upon energization thereof.

Having dispatched the carrier 25 back to the galley the stewardess will remove the stop member 155 and replace it on the trackway 31 at a new position at which she desires the carrier 25 to automatically stop when it returns filled from the galley. The operation of the rod 151, cam 149, plunger 148 and switch 145 when the end of the rod 151 engages the arm 154 of the stopping member 155 is identical with that described for its automatic stopping at the galley position except that the switch 145 is operated in a reverse direction.

The stewardess will now turn to the carrier 35, release its detent 47 and move it laterally toward the aisle of the cabin. She will then release the detent 67 and lower the carrier 35 into a position corresponding to that occupied by the carrier 25 in FIGURE 1. Thereupon she releases curtains 108 and removes the successive trays from the carrier, first snapping down the latches 86 which hold each tray against involuntary movement out of the carrier.

The serving operation continues from alternate carriers at positions progressively moving along the cabin until all the passengers have been served. In this manner one carrier may be loaded while the other is unloaded and the stewardesses are relieved of all labor or carrying trays along the cabin aisle, the trays being delivered to them with the passenger selections at any serving position selected by positioning the stop member 155 along the trackway.

When the serving has been completed it is desired that the carrier be collapsed and folded into a compact unit presenting a minimum obstruction. This operation is best shown in FIGURES 8 through 14 of the drawing. The rods 91 and 92 are first disengaged from the sockets 94 and swung against their respective side panels where they are engaged with the clips 95. Plungers 83 disengage the latches 81 and the side panel 75 is swung upwardly into the dotted line position of FIGURE 8. Thereafter the side panel 76 is swung upwardly as shown in FIGURE 9, at which time the hinges 79 open up and the clips 101 are moved upwardly along the edges of the side panel 76, as indicated by the arrow in FIGURE 9, into the position of FIGURE 10. With the hinge link 102 extended the edges of the pans 54 and 78 now engage to form a flat compact enclosure with the side panels 75 and 76 disposed therein. In this collapsed and folded position the pans 54 and 78 are locked together by means of conventional snap locks 175.

As is well known in slide constructions, the slides 45 may be removed entirely from the supporting brackets or channels 44, so that the carrier 25 is entirely disassembled from the carriage 28. A flat plate may be substituted for the carrier under this condition if it is desired to close off the bottom of the carriage from access or for appearance. The carriage 28 may obviously be bodily removed from the trackways 31 at the ends thereof at a removable section.

For its aircraft operations it is desired to form the carrier and its associated parts of light but strong materials, such as aluminum, magnesium, fibre glass, or other plastics. Thus the trackways 31, the carriage 28 and the carrier supporting and mounting parts are preferably formed of a light weight metal such as aluminum or magnesium, while the carrier pans and side panels may be formed from the same metals or from fibre glass or other plastics which are relatively strong and light and may easily be kept sanitary without damage from cleaning agents. The bottom section of the carrier is preferably of pan shape and is provided with an absorbent liner for the retention of liquids therein. Also, the side panels and the end curtains are fitted inside of the upturned walls of the bottom pan so that any liquid which might slosh out of the containers on the trays will drip downwardly into the pan to be retained therein and thus prevent soilage outside of the carrier beneath the line of carrier travel. It will be understood that the absorbent liner for the pan is easily replaceable to maintain sanitary conditions. While the motor 120 has been illustrated as an electric motor, it will, of course, be understood that the invention contemplates the use of other types of driving motors, such as a pneumatic motor driven from a small compressed air tank which could be charged as necessary. Also an endless belt or chain could be used as the driving means.

While a certain and presently preferred embodiment of the invention has been specifically shown and described herein, it will be understood that the invention is not limited thereto as many adaptations thereof will be apparent to those skilled in the art and the invention is to be given its broadest interpretation within the terms of the following claims.

I claim:

1. A transport and delivery system comprising: trackways extending from a loading to a delivery area; a carriage suspended from said trackways by wheels riding thereon; a carrier mounted on said carriage for movement therewith along said trackways, said carrier mounting means providing for movement thereof transversely of said carriage and trackways and for vertical movement relative to the carriage into a more accessible position facilitating loading and unloading of the carrier; and means in addition to said mounting means for folding said carrier in collapsed position against said carriage in space saving relation.

2. A transport and delivery system comprising: trackways extending from a loading to a delivery area; a carriage suspended from said trackways by wheels riding thereon; extensible slides mounted on said carriage transversely of said trackways; expanding linkages mounted on said slides; a carrier supported by said expanding linkages whereby said carrier may be moved along said trackways with said carriage and may be moved transversely of the trackways and vertically relative to the carriage to facilitate access to the carrier, said carrier having elements in addition to said slides and linkages folding upwardly into a compact unit positioned beneath said carriage when said slides and linkages are retracted.

3. A transport and delivery system comprising: trackways extending from a loading to a delivery area; a carriage suspended from said trackways by wheels riding thereon; extensible slides mounted on said carriage transversely of said trackways; expanding linkages mounted on said slides; a carrier supported by said expanding linkages whereby said carrier may be moved along said trackways with said carriage and may be moved transversely of said trackways and vertically relative to the carriage to facilitate access to the carrier, said carrier including top, bottom and side portions in addition to said slides and linkages, said side portions being swingable inwardly and upwardly relative to said top portion and said bottom portion being engageable with said top portion with side portions therebetween to form a compact unit.

References Cited in the file of this patent

UNITED STATES PATENTS

| 1,314,965 | Lamont | Sept. 2, 1919 |
| 1,463,090 | Nafziger | July 24, 1923 |
| 1,526,695 | Clarke | Feb. 17, 1925 |
| 1,606,627 | Gromer | Nov. 9, 1926 |
| 1,819,806 | Allen | Aug. 18, 1931 |
| 2,435,755 | Schimpff | Feb. 10, 1948 |
| 2,456,104 | Anderson | Dec. 14, 1948 |
| 2,649,930 | Purdy | Aug. 25, 1953 |
| 2,692,744 | Burkhard | Oct. 26, 1954 |